United States Patent [19]

Summers et al.

[11] Patent Number: 5,732,281
[45] Date of Patent: Mar. 24, 1998

[54] PROGRAMMABLE POWER MANAGEMENT CIRCUIT FOR A POWER SUPPLY IN A COMPUTER SYSTEM

[75] Inventors: Jefferson G. Summers, Marietta; Nelson W. Willhite, Duluth, both of Ga.

[73] Assignee: NCR Corporation, Dayton, Ohio

[21] Appl. No.: 597,421

[22] Filed: Feb. 8, 1996

[51] Int. Cl.$^6$ .................................................. G06F 1/26
[52] U.S. Cl. ...................... 395/828; 395/830; 395/182.12
[58] Field of Search ........................... 395/750, 828–830, 395/182.12, 182.2, 651–652; 364/707

[56] References Cited

U.S. PATENT DOCUMENTS

| | | | |
|---|---|---|---|
| 4,236,207 | 11/1980 | Rado et al. | 395/493 |
| 4,335,445 | 6/1982 | Nercessian | 395/750 |
| 4,403,303 | 9/1983 | Howes et al. | 395/500 |
| 4,788,647 | 11/1988 | McManus et al. | 364/494 |
| 4,899,272 | 2/1990 | Fung et al. | 365/230.03 |
| 5,014,193 | 5/1991 | Garner et al. | 395/830 |
| 5,019,996 | 5/1991 | Lee | 364/483 |
| 5,040,153 | 8/1991 | Fung et al. | 365/230.03 |
| 5,041,964 | 8/1991 | Cole et al. | 395/750 |
| 5,237,692 | 8/1993 | Raasch et al. | 395/740 |
| 5,239,495 | 8/1993 | Nanno et al. | 364/707 |
| 5,241,680 | 8/1993 | Cole et al. | 395/750 |
| 5,274,791 | 12/1993 | Bracking et al. | 395/405 |
| 5,274,797 | 12/1993 | Barlow et al. | 395/183.22 |
| 5,317,723 | 5/1994 | Heap et al. | 395/500 |
| 5,390,350 | 2/1995 | Chung et al. | 395/750 |
| 5,457,784 | 10/1995 | Wells et al. | 395/829 |
| 5,504,910 | 4/1996 | Wisor et al. | 395/750 |
| 5,567,993 | 10/1996 | Jones et al. | 307/43 |
| 5,568,424 | 10/1996 | Cernea et al. | 365/185.33 |

*Primary Examiner*—Jack B. Harvey
*Assistant Examiner*—Sumati Lefkowitz
*Attorney, Agent, or Firm*—Paul W. Martin

[57] ABSTRACT

A programmable power management circuit for a computer which allows a power supply to be configured prior to and after bootup of the computer. A switch applies power from a power supply to a processor within the computer. A first memory stores default configuration data for controlling the power supply. A power control circuit senses power from the power supply and controls the switch. A loader circuit produce a signal and replaces the default configuration data in the first memory with the configuration data specific to the computer. The power control circuit produces a control signal, after receiving the signal from the loader circuit, that causes the switch to apply power to the processor so that the computer can boot up. The loader circuit may additionally check for errors in the configuration data specific to the computer. Loader circuit replaces the default configuration data with the configuration data specific to the computer only if the loader circuit finds no errors. A software utility allows the configuration data to be changed after bootup.

24 Claims, 6 Drawing Sheets

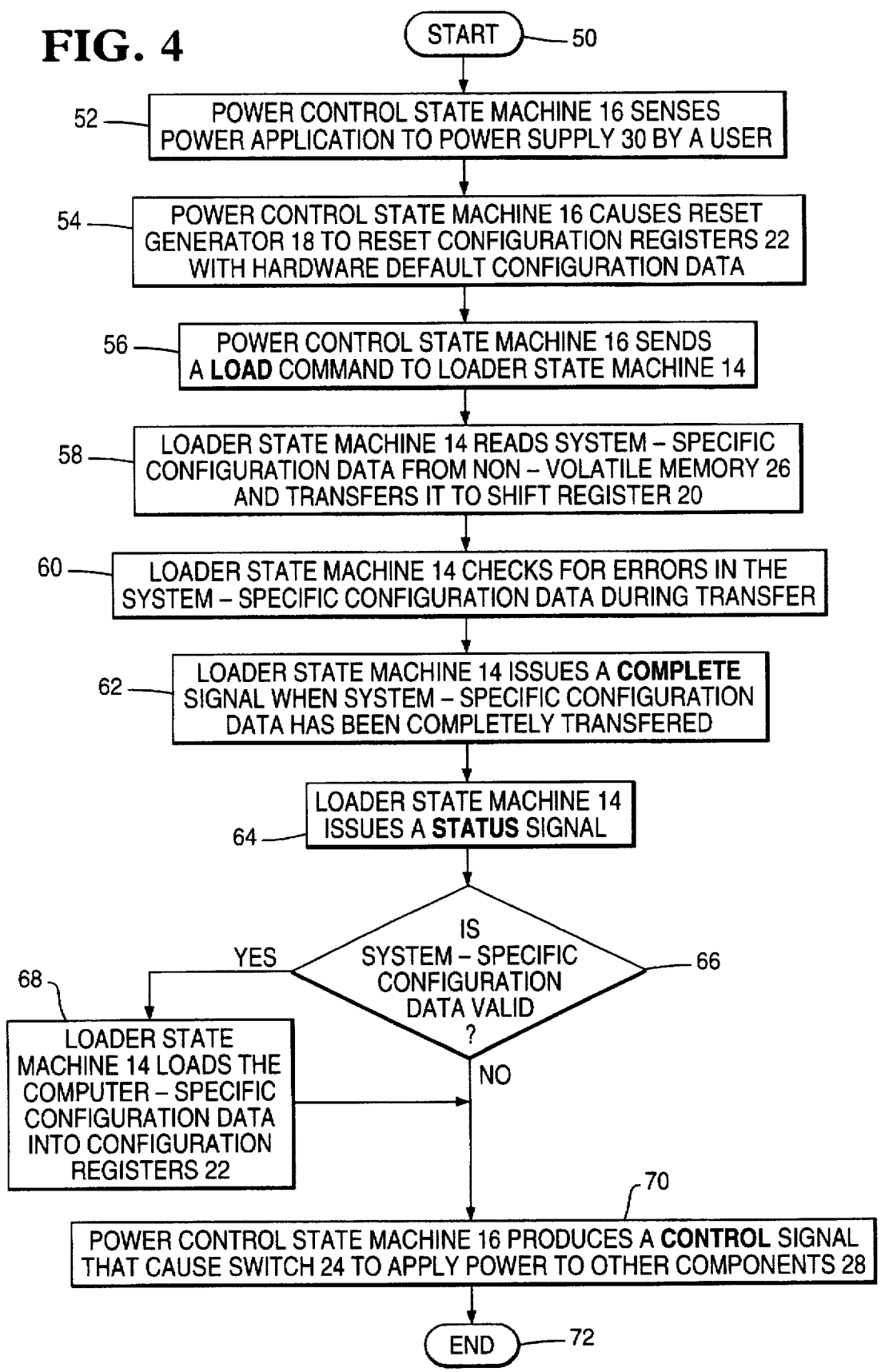

PROGRAMMABLE POWER MANAGEMENT CIRCUIT FOR A POWER SUPPLY IN A COMPUTER SYSTEM

BACKGROUND OF THE INVENTION

The present invention relates to power management circuitry and computers, and more specifically to a programmable power management circuit for a computer.

Integrated circuits may be classified into two groups: those that are configurable to operate in many different types of systems, and those that are designed to operated only in a specific type of system. Configurability provides system design flexibility. Most integrated circuits achieve this flexibility via software programmability.

Power management circuits in computers are typically of the non-configurable type. This is because software programmability is not available in computers before power is applied.

Therefore, it would be desirable to provide a programmable power management circuit for a computer that is programmable before and after a computer boots, and that is capable of being configured to work in many types of computer systems.

SUMMARY OF THE INVENTION

In accordance with the teachings of the present invention, a programmable power management circuit for a computer is provided. A switch applies power from a power supply to a processor within the computer. A first memory stores default configuration data for controlling the power supply. A power control circuit senses power from the power supply and controls the switch. A loader circuit produce a signal and replaces the default configuration data in the first memory with the configuration data specific to the computer. The power control circuit produces a control signal, after receiving the signal from the loader circuit, that causes the switch to apply power to the processor so that the computer can boot up. The loader circuit may additionally check for errors in the configuration data specific to the computer. Loader circuit replaces the default configuration data with the configuration data specific to the computer only if the loader circuit finds no errors. A software utility allows the configuration data to be changed after bootup.

It is accordingly an object of the present invention to provide a programmable power management circuit for a computer.

It is another object of the present invention to provide a power management circuit for a computer that is programmable before and after a computer boots.

It is another object of the present invention to provide a programmable power management circuit for a computer that is capable of being of configured to work with computer-specific information so that it can operate in many types of computer systems.

It is another object of the present invention to provide a programmable power management circuit for a computer that includes a hardware default configuration which allows the computer to boot up with some minimum level of functionality and which allows the power management circuit to be programmed at that minimum level of functionality in order to increase the level of functionality to a normal level.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 4 is a flow diagram illustrating the operation of the power management circuit.

DETAILED DESCRIPTION OF THE PREFERRED EMBODIMENT

Figure 1:
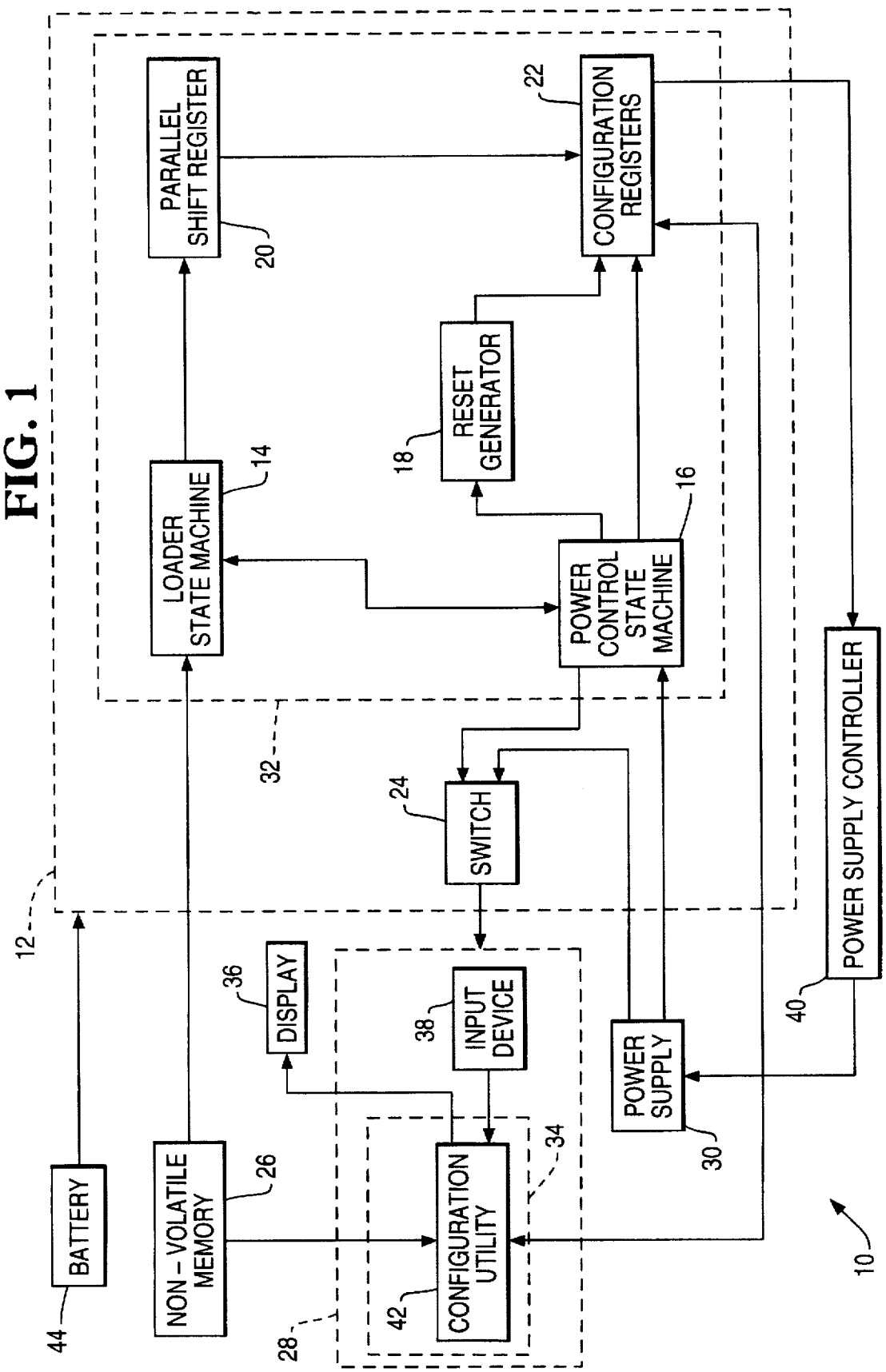
FIG. 1 is a block diagram of a computer system, including a power control circuit of the present invention.

Computer 10 includes power management circuit 12, power supply 30, non-volatile memory 26, other components 28 that are powered by power supply 30, display 36, and battery 44.

Power management circuit 12 includes loader state machine 14, power control state machine 16, reset generator 18, parallel output serial shift register 20, and configuration registers 22.

Loader state machine 14 transfers configuration data specific to computer 10 from non-volatile memory 26 to shift register 20 in response to a LOAD command from power control state machine 16 and prior to power being applied to other components 28.

As the computer-specific configuration data is being loaded from non-volatile memory 26, loader state machine 14 checks for the following error conditions: no device present, device not programmed, and corrupt device data. The first error occurs when loader state machine 14 detects the absence of non-volatile memory 26. The second error occurs when loader state machine 14 detects a blank, i.e., unprogrammed, non-volatile memory 26. The third error occurs when loader state machine 14 detects a parity error in the data in non-volatile memory 26. In each case, loader state machine 14 allows default values to remain unchanged.

After all the computer-specific configuration data has been transferred to shift register 20 or an error condition detected, loader state machine 14 issues a COMPLETE signal to power control state machine 16.

Preferably, a serial link couples non-volatile memory 26 to loader state machine 14, in order to minimize the number of input-output pins required by non-volatile memory 26 and power management circuit 12.

Power control state machine 16 senses power from power supply 30 when computer 10 is turned on by a user. Computer 10 is preferably turned on when the user engages an on/off switch. Power control state machine 16 also monitors for voltages on any auxiliary power supplies and for voltage on a CMOS battery within computer 10. After it senses battery-backed power, power control state machine 16 causes reset generator 18 to reset configuration registers 22 with hardware default configuration data.

Power control state machine 16 issues the LOAD command to loader state machine 14 after it senses that power from power supply 30 has stabilized. After power control state machine 16 receives the COMPLETE signal from loader state machine 14, and if the STATUS signal from loader state machine 14 indicates that the computer-specific configuration data are valid, loader state machine 14 loads the computer-specific configuration data into configuration registers 22. If the STATUS signal indicates that the computer-specific configuration data are invalid, loader state machine 14 does not load the computer-specific data into configuration registers 22, which allows the hardware default configuration data to remain in configuration registers 22. In either event, power control state machine 16 produces a CONTROL signal that causes switch 24 to apply power to other components 28 making up the rest of computer 10.

Preferably, hardware default values are chosen which facilitate not less than a minimum level of operability of computer 10 in the event of a failure in loading the system-specific configuration data from non-volatile memory 26 into configuration registers 22. A minimum level of operability is defined herein to mean enough functionality to allow computer 10 to boot, interrogate itself with a power-on self-test (POST), and run a utility program to reconfigure configuration registers 22 based upon the results of the POST.

Reset generator 18 causes the hardware default configuration data to be loaded into configuration registers 22 in response to a RESET signal from power control state machine 16.

Shift register 20 buffers computer-specific configuration data from non-volatile memory 26 until the load is complete and verified to be correct. Shift register 20 is preferably a serial load, parallel out shift register.

Configuration registers 22 store configuration data, either hardware default configuration data or system-specific configuration data.

Preferably, loader state machine 14, power control state machine 16, reset generator 18, parallel shift register 20, and configuration registers 22 are all located on a single ASIC 32.

Switch 24 applies power to other computer components 28 that make up the rest of computer 10. Switch 24 is preferably a power switching field effect transistor located on a main mother board within computer 10.

Power supply 30 is preferably an off-the-shelf computer power supply which receives a power-on and UPS enable signals from power supply control circuitry Power supply controller 40 reads the configuration data stored within configuration registers 22 to control its operation. Since most of the configuration data is used "on the fly", no re-initialization is required.

Non-volatile memory 26 stores the system-specific configuration data. Preferably, non-volatile memory 26 is a read-only memory (ROM), which may be programmable (EEPROM). Of course, non-volatile memory 26 may also include BIOS instructions for booting up computer 10, rather than having a separate BIOS ROM. Although, this would preclude the use of a serial EEPROM for non-volatile memory 26 and increase the ASIC pin count.

Other computer components 28 are components within computer 10 that have yet to be powered. Power to components 28 is controlled by power management device 12 through switch 24. Components 28 include processor 34 and input device 38, as well as other motherboard components and adapter cards. After receiving power through switch 24, processor 34 reads BIOS instructions from non-volatile memory 26. Processor 34 executes configuration utility 42 which automatically or with user control modifies the contents of configuration registers 22, for example, when an error has occurred during download of configuration data from non-volatile memory 26.

New configuration data is preferably entered as firmware or software upgrades, although configuration data may be modified by a user using input device 38. Input device 38 is preferably a keyboard.

Display 36 is part of computer 10, but is not typically powered through power supply 30. Display 36 allows a user to monitor operation of computer 10, including the entry of new configuration data into configuration registers 22.

Figure 2:
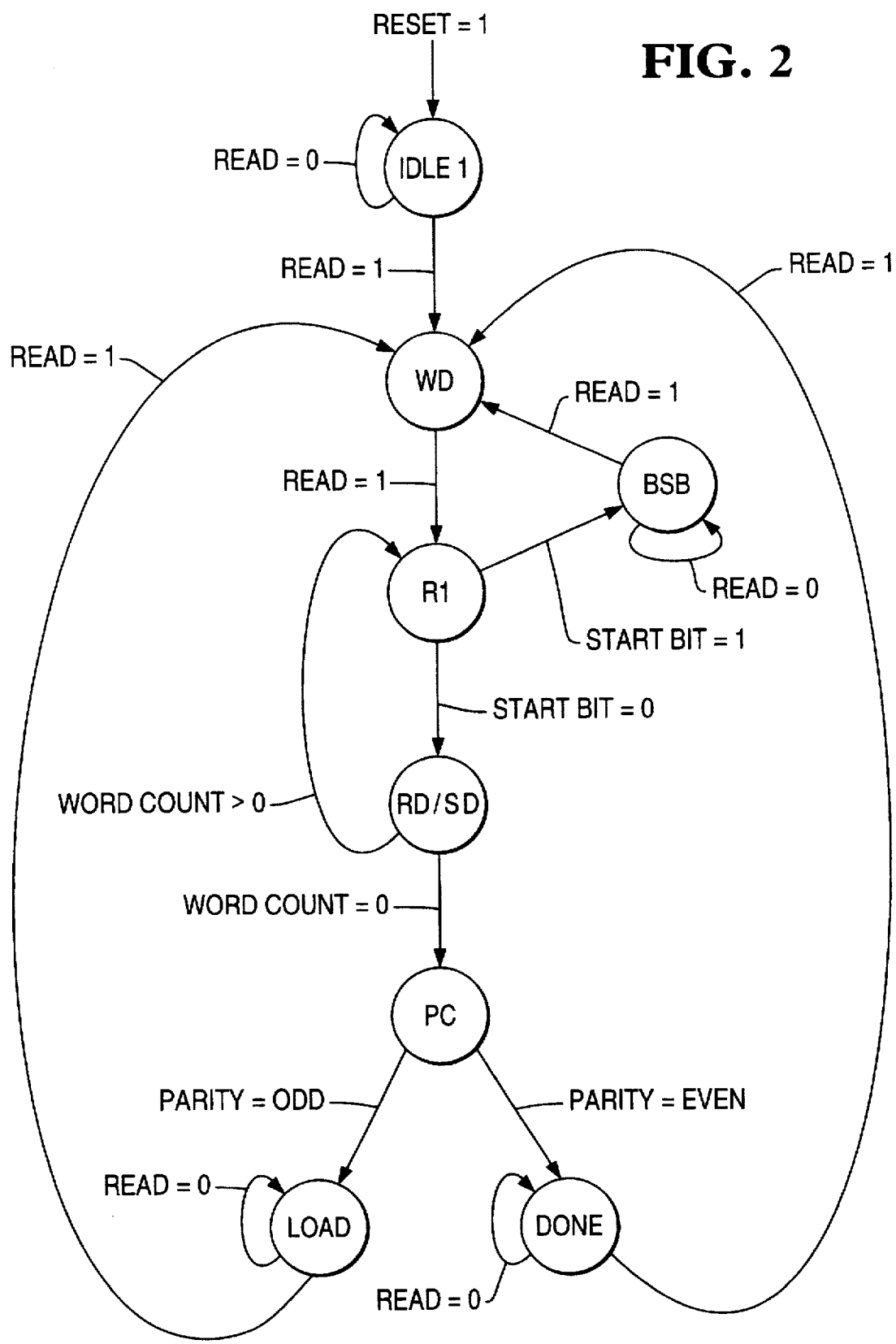
FIG. 2 is a state diagram illustrating the operation of the loader state machine.

Battery 44 provides power to circuit 12 prior to bootup of computer 12. Thus, circuit 12 is active prior to the actuation of the computer's on/off switch by a user. Turning now to FIG. 2, loader state machine 14 is discussed in more detail.

The key for state machine 14 is shown below in Table I:

TABLE I

| States | Definition |
|---|---|
| WD | Write Disable. State machine 14 shifts out a 9-bit write disable command to the serial EEPROM to prohibit the EEPROM from being inadvertently written to. |
| RI | Read Instruction. State machine 14 shifts out a 3-bit read command followed by a 6-bit address of the word to be read. The address is based on the value of Word Count which is the output of a counter external to state machine 14. |
| RD/SD | Read Data/Send Data. State machine 14 clocks in 16 bits (one word) of data from EEPROM. It also clocks out (with one clock delay from the incoming data) the same 16 bits to the serial shift register. At the conclusion of this state, the Word Count is checked to see of all words have been read. If they have not all been read, the Word Count is decremented. |
| PC | Parity Check. State machine 48 checks parity of the data. |
| Load | Load. State machine 14 pulses the load line indicating that the memory read is complete, and data is valid, Status is set to '11'. |
| Done | Main power on; Read is complete but not valid. Status is set to '01'. |
| BSB | Bad Start Bit. State machine 14 pulses the done line indicating the memory read is complete, but not valid. Status is set to '10' |

Figure 3A:
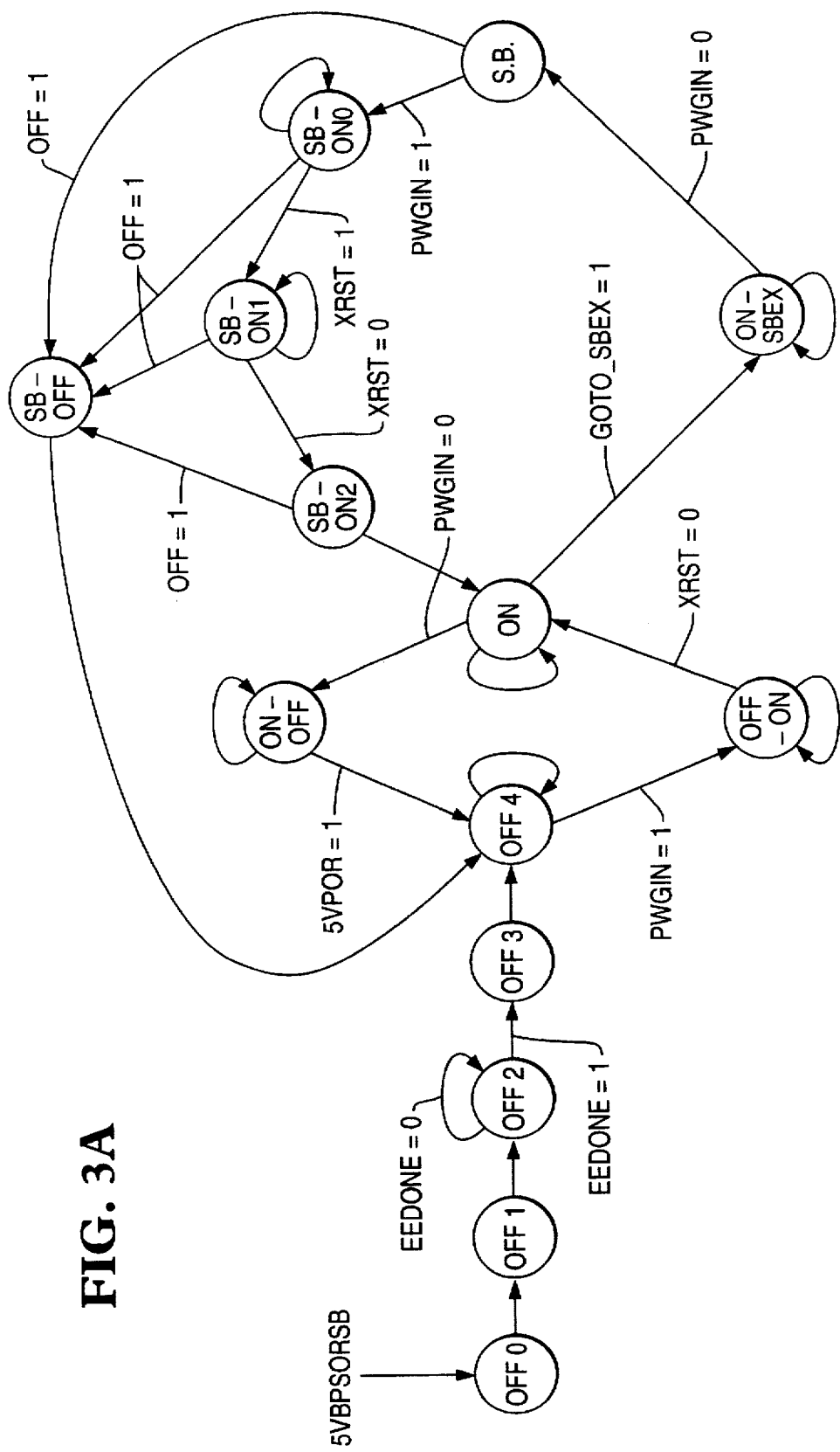
FIG. 3 is a state diagram illustrating the operation of the power control state machine.
Figure 3B:
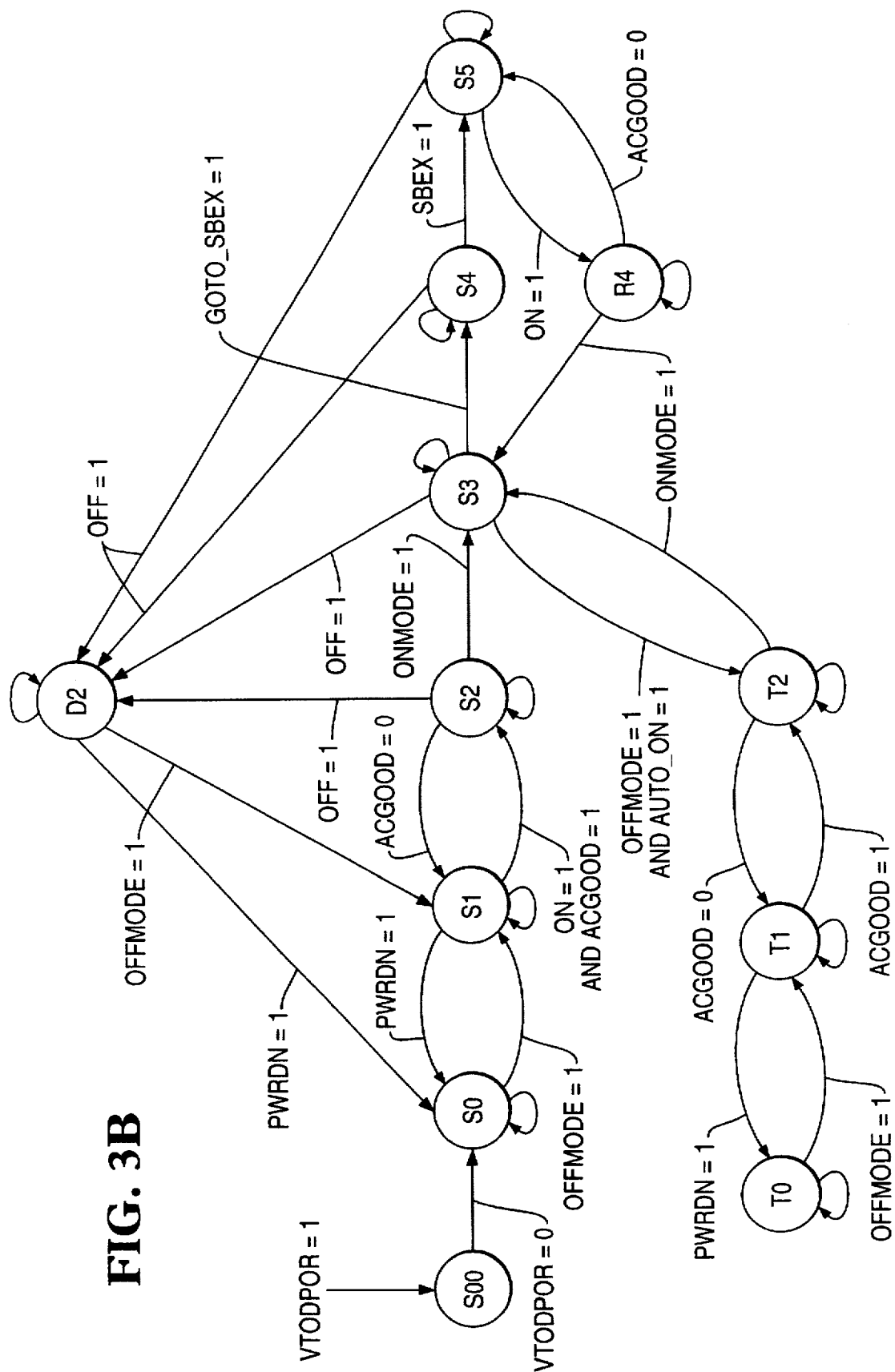

Turning now to FIGS. 3A and 3B, power control state machine 16 is discussed in more detail. FIGS. 3A and 3B are interacting state machines 46 and 48 for implementing the main power control functionality. Although it is possible to create one state machine 16 to control the entire process, separating state machine 16 into two interacting state machines makes state machine 16 much simpler than it would have been with one large state machine.

The key for state machine 46 is shown below in Table II:

TABLE II

| States | Definition |
|---|---|
| Off0 | Default state; waiting for 5VBPS to become good. |
| Off1 | Connects 5VBPS rail to system and signals EEPROM controller to begin read. |
| Off2 | Waits for EEPROM read to complete. |
| Off4 | Enables state machine 48 to accept computer turn on. |
| Off-On | Connects main 5V power to computer and waits for power supply voltage rails to stabilize. |
| On | Main power on; operational state. |
| On-Off | Disconnects main 5V power to computer when signal indicating power supply is out of tolerance is received. |
| On-SBEX | Switches computer to standby condition and waits for stabilization of power supply rails. |
| S.B. | Main standby state. |
| SB0, SB1, | Series of states that bring computer out of |

TABLE II-continued

| States | Definition |
| --- | --- |
| SB2 | standby state when a good power supply signal is indicated. |
| SB-Off | Takes the computer from standby to off by disconnecting the standby power supply rail. |

State machine 48 has an initial state S00. After the VCMOS rail is good, it moves to state S0. Independent of state machine 48, state machine 46 moves from state OFF0 to state OFF4, in the process kicking off the serial EEPROM (i.e., non-volatile memory 26) read and waiting for its completion.

State machines 46 and 48 interact at several points. The first point of interaction between state machines 46 and 48 is at states OFF4 and S1. When state machine 46 reaches state Off4, device 12 has been initialized (via the EEPROM read) and is ready for computer turn on. One output of state machine 46, Offmode, transitions from '0' to '1' when state machine 46 enters state OFF4. Output Offmode is an input to state machine 48 which allows it to transition to state S1. At this point, power supply 30 is waiting for a turn on signal. State machine 48 transitions to state S2 when it receives an 'on' signal and signals power supply 30 to bring up the main 5V supply. After the 5V supply has stabilized, power supply 30 signals that power is good by activating PWGIN which allows state machine 46 to transition from state OFF4 to state ON. Output Onmode of state machine 48 transitions from 0 to 1 when state machine 48 enters the ON state. This allows state machine 48 to transition to state S3, its "system on" state.

In summary, state machine 48 controls the "on switch" to power supply 30, thereby controlling the response of state machine 46 to power supply 30 turning on (by sensing PWGIN and the power supply rails) and transitioning to the ON state. State machine 46 outputs Offmode, Onmode and PWRDN (active in Off3, Off2, and Off1 states) which pace the transitions of state machine 48.

Turning now to FIG. 4, the operation of power management circuit 12 is illustrated in more detail, beginning with START 50.

In step 52, power control state machine 16 senses that power has been applied to power supply 30 by a user.

In step 54, power control state machine 16 causes reset generator 18 to reset configuration registers 22 with the hardware default configuration data.

In step 56, power control state machine 16 sends a LOAD command to loader state machine 14.

In step 58, loader state machine 14 reads system-specific configuration data from non-volatile memory 26 and transfers it to shift register 20.

In step 60, loader state machine 14 checks for errors in the system-specific configuration data during transfer.

In step 62, loader state machine 14 issues a COMPLETE signal when system-specific configuration data has been completely transferred.

In step 64, loader state machine 14 issues a STATUS signal indicating whether the system-specific configuration data is valid or invalid due to errors.

In step 66, if the system-specific configuration data is valid, loader state machine 14 loads the computer-specific configuration data into configuration registers 22 in step 68. If the system-specific configuration data is invalid, loader state machine 14 does not load the computer-specific configuration data into configuration registers 22, which causes power management device 12 to use the hardware default configuration data.

In step 70, power control state machine 16 produces a CONTROL signal that causes switch 24 to apply power to other components 28 so that computer 10 can boot up. From here, processor 34 executes a standard POST and loads an operating system.

In step 72, the method ends.

Figure 5:
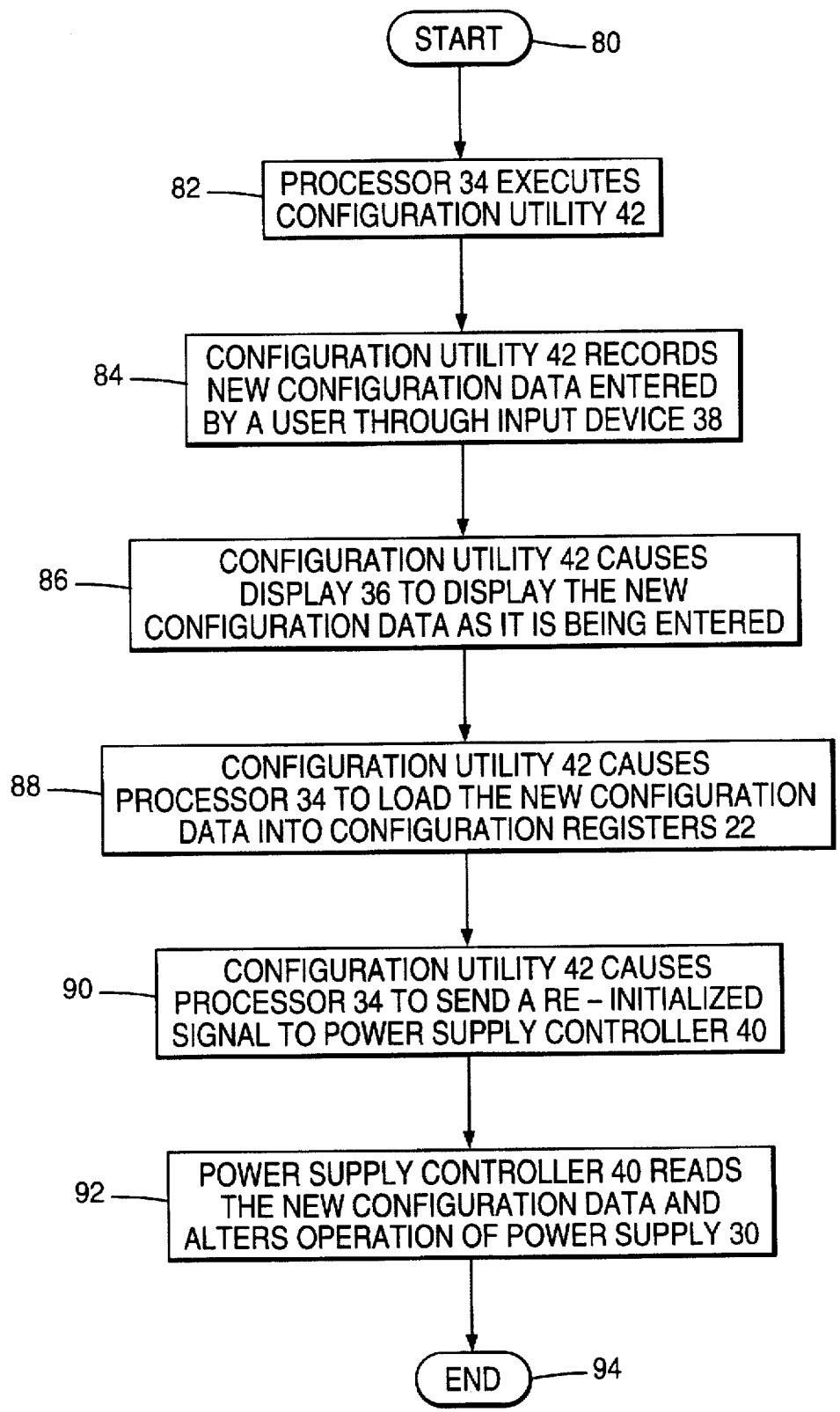
FIG. 5 is a flow diagram illustrating a method for programming the power management circuit.

Turning now to FIG. 5, a method of programming power management device 12 is illustrated, beginning with START 80.

In step 82, processor 34 executes configuration utility 42.

In step 84, configuration utility 42 records new configuration data entered by a user into input device 38.

In step 86, configuration utility 42 causes display 36 to display the new configuration data as it is being entered.

In step 88, configuration utility 42 causes processor 34 to load the new configuration data into configuration registers 22.

In step 90, configuration utility 42 causes processor 34 to send a re-initialized signal to power supply controller 40.

In step 92, power supply controller 40 reads the new configuration data and alters operation of power supply 30. The configuration data controls more than power supply controller 40. It controls many system level aspects of the computer including the IO address space, the IO address length, access modes to internal real time clock cells, video ROM address mapping and control, and LANROM address mapping and control.

In step 94, the method ends.

Although the present invention has been described with particular reference to certain preferred embodiments thereof, variations and modifications of the present invention can be effected within the spirit and scope of the following claims.

What is claimed is:

1. A programmable power management circuit for controlling a power supply within a computer system comprising:

a switch for applying power from the power supply to a processor within the computer system;

a first memory which stores default configuration data for controlling the power supply;

a power control circuit which senses power from the power supply and which controls the switch; and a loader circuit which sends a signal to the power control circuit and which replaces the default configuration data in the first memory with configuration data specific to the computer system from a second memory;

wherein the power control circuit produces a control signal, after receiving the signal from the loader circuit, that causes the switch to apply power to the processor so that the computer system can boot up; and wherein the configuration data specific to the computer system is read by a power supply controller to control the power supply.

2. The power management circuit as recited in claim 1, wherein the loader circuit checks for errors in the configuration data specific to the computer system, and wherein the signal from the loader circuit indicates that the loader circuit has finished checking for errors.

3. The power management circuit as recited in claim 2, wherein the loader circuit replaces the default configuration data with the configuration data specific to the computer system only if the configuration data specific to the computer system is error free.

4. The power management circuit as recited in claim 1, further comprising:
a reset circuit coupled to the power control circuit which generates a reset signal for causing the first memory to load the default configuration data after the power control circuit has sensed power from the power supply.

5. The power management circuit as recited in claim 1, wherein the first memory comprises:
a number of registers.

6. The power management circuit as recited in claim 1, wherein the second memory comprises:
a non-volatile memory.

7. The power management circuit as recited in claim 1, wherein the second memory comprises:
an EEPROM.

8. The power management circuit as recited in claim 1, wherein the loader circuit comprises:
a state machine; and
a parallel output serial shift register coupled to the state machine.

9. The power management circuit as recited in claim 1, further comprising:
a second power supply for powering the power management circuit prior to engagement of an on/off switch by a user of the computer system.

10. The power management circuit as recited in claim 1, further comprising:
a battery for powering the power management circuit prior to engagement of an on/off switch by a user of the computer system.

11. A computer system comprising:
a power supply;
a power supply controller coupled to the power supply;
a processor powered by the power supply; and
a programmable power management circuit for controlling the power supply, including
a switch for applying power from the power supply to the processor;
a first memory which stores default configuration data for controlling the power supply;
a power control circuit which senses power from the power supply and which controls the switch; and
a loader circuit which sends a signal to the power control circuit and which replaces the default configuration data in the first memory with [the] configuration data specific to the computer system from a second memory;
wherein the power control circuit produces a control signal, after receiving the signal from the loader circuit, that causes the switch to apply power to the processor so that the computer system can boot up; and
wherein the configuration data specific to the computer system is read by the power supply controller to control the power supply.

12. The computer system as recited in claim 11, wherein the loader circuit checks for errors in the configuration data specific to the computer system, and wherein the signal from the loader circuit indicates that the loader circuit has finished checking for errors.

13. The computer system as recited in claim 12, wherein the loader circuit replaces the default configuration data with the configuration data specific to the computer system only if the configuration data specific to the computer system is error free.

14. The computer system as recited in claim 11, wherein the power management control circuit further comprises:
a reset circuit coupled to the power control circuit which generates a reset signal for causing the first memory to load the default configuration data after the power control circuit has sensed power from the power supply.

15. The computer system as recited in claim 11, wherein the first memory comprises:
a number of registers.

16. The computer system as recited in claim 11, wherein the second memory comprises:
a non-volatile memory.

17. The computer system as recited in claim 11, wherein the second memory comprises:
an EEPROM.

18. The computer system as recited in claim 11, wherein the loader circuit comprises:
a state machine; and
a parallel output serial shift register coupled to the state machine.

19. The computer system as recited in claim 11, further comprising:
a second power supply for powering the power management circuit prior to engagement of an on/off switch by a user of the computer system.

20. The computer system as recited in claim 11, further comprising:
a battery for powering the power management circuit prior to engagement of an on/off switch by a user of the computer system.

21. The computer system as recited in claim 11, wherein the processor executes a configuration utility program for reading and modifying configuration data specific to the computer system.

22. The computer system as recited in claim 11, wherein the processor executes a configuration utility program for reading and modifying default configuration data.

23. A method of controlling power application to a processor in a computer comprising the steps of:
sensing power from a power supply by a power management device;
reading configuration data specific to the computer from a first memory by the power management device;
replacing default configuration data in a second memory with the configuration data specific to the computer by the power management device;
producing a control signal by the power management device for causing a switch to apply power from the power supply to the processor so that the computer can boot up by the power management device; and
reading the configuration data specific to the computer by a power supply controller.

24. The method as recited in claim 23, further comprising the steps of:
checking for errors in the configuration data specific to the computer by the power management device before the step of replacing; and
replacing the default configuration data with the configuration data specific to the computer by the power management device only if the configuration data specific to the computer is error free.

* * * * *

UNITED STATES PATENT AND TRADEMARK OFFICE
CERTIFICATE OF CORRECTION

PATENT NO.   : 5,732,281
DATED        : March 24, 1998
INVENTOR(S)  : Jefferson G. Summers et al.

It is certified that error appears in the above-indentified patent and that said Letters Patent is hereby corrected as shown below:

Column 7, line 48, after "with" delete --[the]--.

Column 8, line 50, after "up" delete --by the power management device--.

Signed and Sealed this

Twenty-ninth Day of February, 2000

Attest:

Q. TODD DICKINSON

*Attesting Officer*          *Commissioner of Patents and Trademarks*